(12) United States Patent
Klop et al.

(10) Patent No.: US 11,472,495 B1
(45) Date of Patent: Oct. 18, 2022

(54) QUICK-RELEASE VEHICLE AIR DAM

(71) Applicant: Ford Global Technologies, LLC, Dearborn, MI (US)

(72) Inventors: Aaron Peter Klop, Bloomfield Hills, MI (US); David Brian Glickman, Southfield, MI (US); Dennis Yee, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/320,505

(22) Filed: May 14, 2021

(51) Int. Cl.
  *B62D 35/00* (2006.01)
  *B62D 35/02* (2006.01)

(52) U.S. Cl.
  CPC ........ *B62D 35/005* (2013.01); *B62D 35/02* (2013.01)

(58) Field of Classification Search
  CPC .......... B60J 1/20; B62D 35/005; B62D 35/02
  USPC ............................................ 296/180.1, 180.2
  See application file for complete search history.

(56) References Cited

U.S. PATENT DOCUMENTS

| | | | |
|---|---|---|---|
| 5,234,247 A | 8/1993 | Pacer | |
| 6,439,646 B1* | 8/2002 | Cornelius | B60J 7/102 296/105 |
| 7,883,140 B2 | 2/2011 | Wurfel et al. | |
| 9,327,779 B1 | 5/2016 | Wey et al. | |
| 2009/0195022 A1* | 8/2009 | Bell | B62D 33/067 296/190.06 |
| 2010/0117396 A1* | 5/2010 | Dayton | B62D 35/001 296/180.1 |
| 2012/0001450 A1* | 1/2012 | Li | B62D 35/007 296/180.1 |
| 2013/0069389 A1* | 3/2013 | Meeks | B62D 35/005 296/180.1 |

(Continued)

FOREIGN PATENT DOCUMENTS

| | | |
|---|---|---|
| DE | 102019109372 | 10/2020 |
| GB | 2399591 | 9/2004 |

(Continued)

OTHER PUBLICATIONS

Speedway Motors; retrieved via the Internet Archive WayBack Machine as existed Jul. 10, 2017. located at https://web.archive.org/web/20170710054204/http://www.speedwaymotors.com:80/1-4-Inch-Quick-Release-Ball-Lock-Dowel-Pin-Steel-Body-1-Inch-Grip,14819.html. (Year: 2017).*

(Continued)

*Primary Examiner* — Jason S Daniels
(74) *Attorney, Agent, or Firm* — Vichit Chea; Carlson, Gaskey & Olds, P.C.

(57) ABSTRACT

An air dam assembly includes, among other things, an air dam and at least one quick-release pin that secures the air dam to a vehicle structure. An air dam positioning method includes, among other things, when an air dam is in a first position, the step of coupling the air dam to a vehicle structure using at least one quick-release pin in an engaged position. The method further includes transitioning the at least one quick-release pin to a disengaged position, and then, when the quick-release pin is in the disengaged position, moving the air dam to a second position that is different than the first position. The method then, when the air dam is in the second position, includes coupling the air dam to the vehicle structure using the at least one quick-release pin.

18 Claims, 5 Drawing Sheets

(56) References Cited

U.S. PATENT DOCUMENTS

2015/0210324 A1\* 7/2015 Kojima ............... B62D 35/02
296/180.1

FOREIGN PATENT DOCUMENTS

JP           H0627458 U   \*   4/1994
JP           2009262714 A   \*   11/2009

OTHER PUBLICATIONS

English translation of JP H06-27458; retrieved via PatentTranslate located www.epo.org. (Year: 2022).\*

\* cited by examiner

QUICK-RELEASE VEHICLE AIR DAM

TECHNICAL FIELD

This disclosure relates generally to an air dam for a vehicle and, more particularly, to an air dam that secured via at least one quick-release pin.

BACKGROUND

A vehicle can include an air dam that blocks airflow beneath the vehicle. Some air dams are active air dams. An actuator assembly can be used to raise and lower an active air dam.

SUMMARY

An air dam assembly according to an exemplary aspect of the present disclosure includes, among other things, an air dam and at least one quick-release pin that secures the air dam to a vehicle structure.

In another example of the foregoing assembly, the quick-release pin secures the air dam assembly to the vehicle structure when the air dam assembly is in a deployed position. The quick-release pin can also secure the air dam assembly to the vehicle structure when the air dam assembly is in a stowed position.

Another example of any of the foregoing assemblies includes an actuator assembly. The air dam is an active air dam that can be raised and lowered by the actuator assembly when the air dam assembly is in a deployed position.

In another example of any of the foregoing assemblies, the quick-release pin is a ball-lock pin.

In another example of any of the foregoing assemblies, the quick-release pin includes spring-biased retaining members.

In another example of any of the foregoing assemblies, the quick-release pin includes a pull ring.

In another example of any of the foregoing assemblies, the quick-release pin includes a cotter pin that engages the quick-release pin.

In another example of any of the foregoing assemblies, the quick-release pin transitions between an engaged position and a disengaged position in response to movement of the quick-release pin along a longitudinal axis of the quick-release pin and without requiring rotating the quick-release pin about the longitudinal axis.

In another example of any of the foregoing assemblies, the quick-release pin extends through an aperture in the air dam and an aperture in the vehicle structure when securing the air dam to the vehicle structure.

In another example of any of the foregoing assemblies, the air dam can be moved between a raised position and a lowered position without withdrawing the quick-release pin from the aperture in the air dam and the aperture in the vehicle structure.

In another example of any of the foregoing assemblies, the vehicle structure includes a passenger side member having a first passenger side aperture and a second passenger side aperture. The quick-release pin includes a passenger side quick-release pin that extends through the first passenger side aperture to couple the air dam to the passenger side member in a deployed position. The passenger side quick-release pin extends through the second passenger side aperture to couple the air dam to the passenger side member in a stowed position.

In another example of any of the foregoing assemblies, the first passenger side aperture is vertically beneath the second passenger side aperture.

In another example of any of the foregoing assemblies, the vehicle structure includes a driver side member having a first driver side aperture and a second driver side aperture. The quick-release pin includes a driver side quick-release pin that extends through the first driver side aperture to couple the air dam to the driver side member in the deployed position. The driver side quick-release pin extends through the second driver side aperture to couple the air dam to the driver side member in the stowed position.

In another example of any of the foregoing assemblies, the driver side member and the passenger side member are both hollow tubes.

An air dam positioning method according to another exemplary aspect of the present disclosure includes, among other things, when an air dam is in a first position, the step of coupling the air dam to a vehicle structure using at least one quick-release pin in an engaged position. The method further includes transitioning the at least one quick-release pin to a disengaged position, and then, when the quick-release pin is in the disengaged position, moving the air dam to a second position that is different than the first position. The method then, when the air dam is in the second position, includes coupling the air dam to the vehicle structure using the at least one quick-release pin.

Another example of the foregoing method includes transitioning the at least one quick-release pin from the engaged position to the disengaged position by sliding the at least one quick-release pin along a longitudinal axis of the quick-release pin without requiring a rotating of the at least one quick-release pin about the longitudinal axis.

In another example of any of the foregoing methods, the air dam is more elevated when in the first position than when in the second position.

In another example of any of the foregoing methods, the transitioning of the at least one quick-release pin includes moving a plurality of spring-biased retaining members of the at least one quick-release pin radially relative to a longitudinal axis of the at least one quick-release pin.

In another example of any of the foregoing methods, the air dam is an active air dam. The method further includes, when the air dam is in the second position, automatically moving the air dam between a raised position and a lowered position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details exemplary air dams that can be quickly transitioned between a deployed position to a stowed position. A user may desire the air dam to be in the deployed position when the vehicle is driving on a highway. The air dam in the deployed position can help redirect airflow. The user may desire the air dam to be in the stowed position when the vehicle is off-roading. In the stowed position, the air dam can have more ground clearance than the air dam in the deployed position. Placing the air dam in the stowed position can help to avoid the air dam contacting terrain beneath the vehicle. Placing the air dam in the stowed position can help to avoid the air dam contacting accessories secured to the vehicle, such as a plow.

Figure 1:
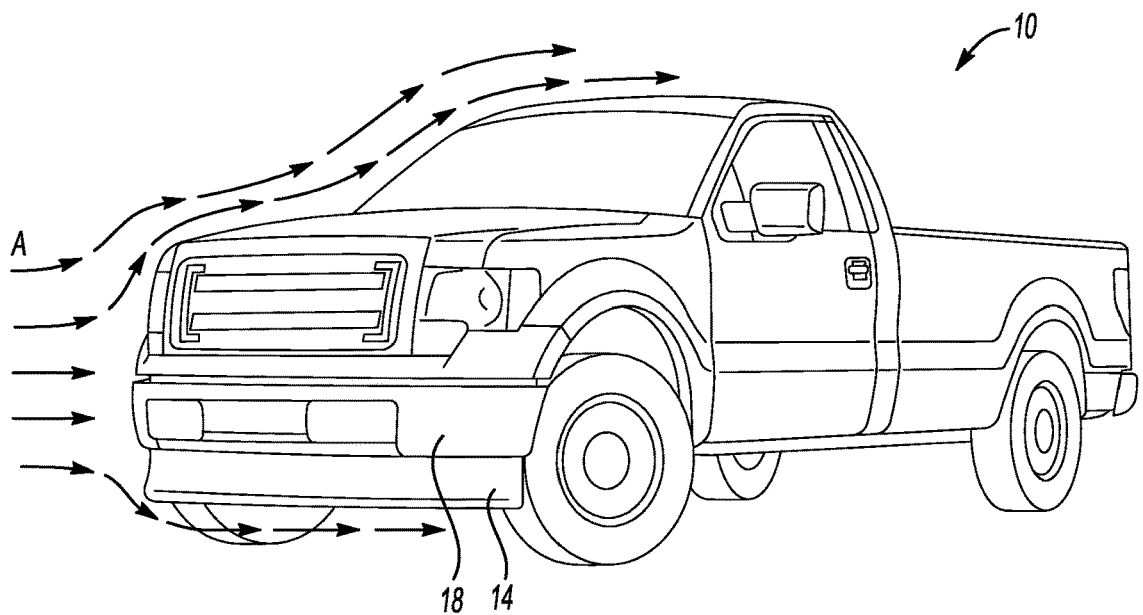
FIG. 1 illustrates a perspective view of a vehicle having an air dam assembly according to an exemplary embodiment of the present disclosure. An air dam of the assembly is in a deployed position.
Figure 2:
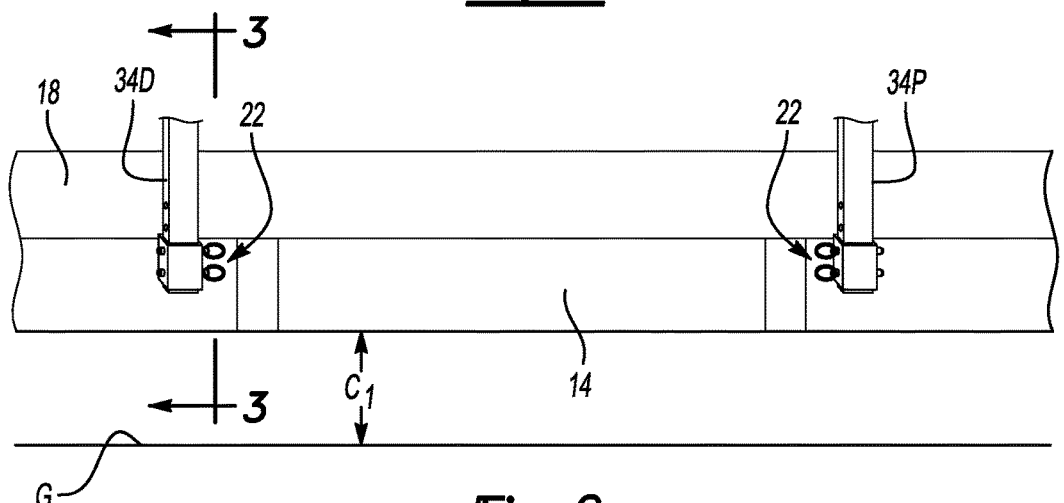
FIG. 2 illustrates a rear view of the air dam assembly of FIG. 1 along with a vehicle structure and bumper.
Figure 3:
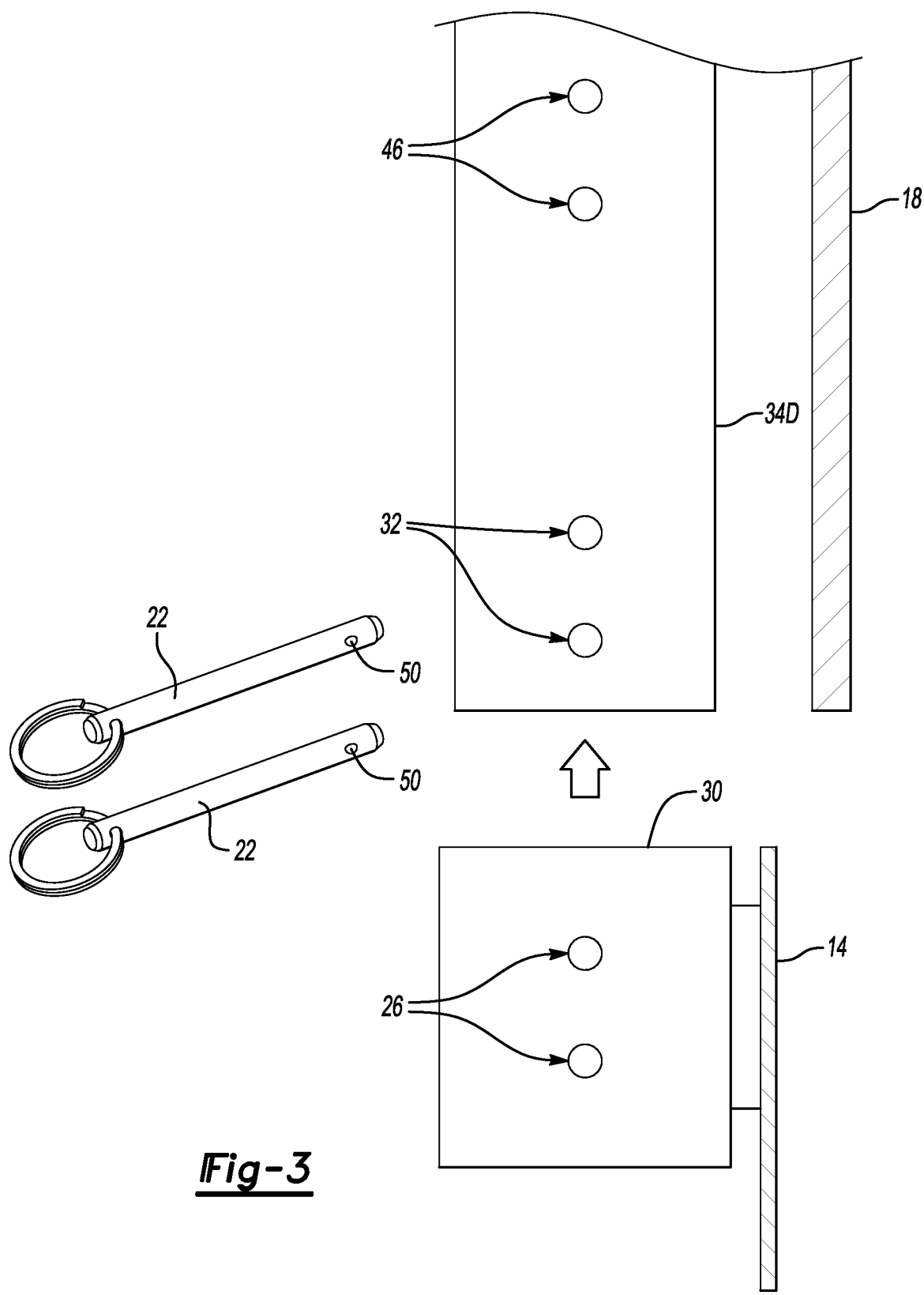
FIG. 3 illustrates a section view at line 3-3 in FIG. 2 when moving the air dam to the deployed position.

With reference to FIGS. 1 to 3, a vehicle 10 includes an air dam 14. In the exemplary embodiment, the air dam 14 is shown in a deployed position. The air dam 14 is vertically beneath a front bumper 18 of the vehicle 10 when the air dam 14 is in the deployed position. The front bumper 18 could be a fixed portion of the air dam, rather than a separate bumper. Vertical, for purposes of this disclosure, is with reference to the general orientation of the vehicle 10 as the vehicle 10 is driven over ground.

The air dam 14 is in the deployed position in FIGS. 1 to 3. In the deployed position, the air dam 14 extends beneath the front bumper 18 and has a clearance C1 to ground G.

To secure the air dam 14, quick-release pins 22 extend through respective apertures 26 in a collar 30 of the air dam 14 and additionally through apertures 32 in a vehicle structure 34D. The quick-release pins 22 couple the air dam 14 to the vehicle structure 34D to secure the air dam 14 in the deployed position.

The vehicle structure 34D is a driver side vehicle structure. The air dam 14 is coupled to the vehicle 10 additionally through a passenger side vehicle structure 34P. The vehicle structures 34D and 34P are hollow tubes in this example. The explanations below that reference the vehicle structure 34D also apply to securing the air dam 14 to the vehicle structure 34P.

Under some vehicle operating conditions, such as off-roading, the user may desire additional clearance between the air dam 14 and the ground G. To provide the additional clearance, the user can withdraw the quick-release pins 22, and then raise the air dam 14 so that the apertures 26 align with second apertures 46 of the vehicle structure 34D. The second apertures 46 are vertically above the first apertures 32 in the vehicle structure 34D.

Figure 4:
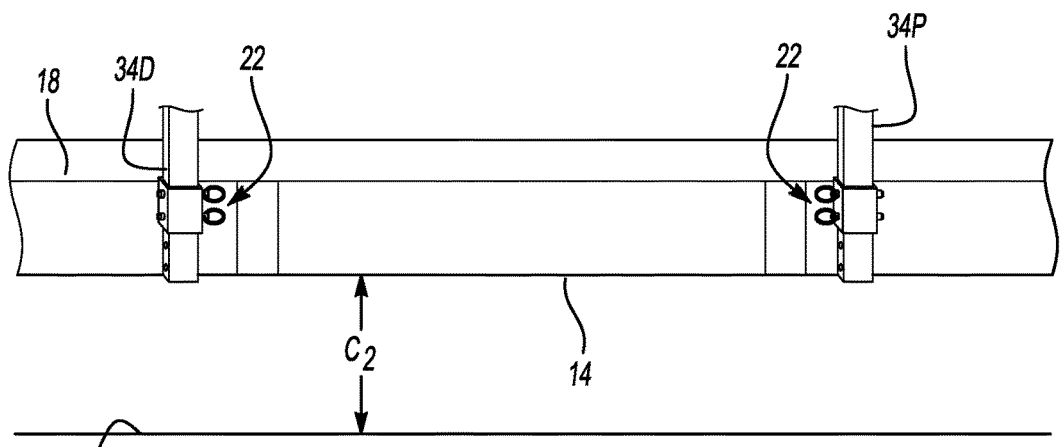
FIG. 4 illustrates the rear view of FIG. 2 when the air dam is in the stowed position.

The user can then insert the quick-release pins 22 into the apertures 26 in the collar 30 and the apertures 46 in the vehicle structure 34D to secure the air dam 14 to the vehicle structure 34D. The air dam 14 is then in a stowed position as shown in in FIG. 4.

A clearance C2 between the air dam 14 and the ground G when the air dam 14 is in the stowed position is greater than the clearance C1 between the air dam 14 and the ground G when the air dam 14 is in the deployed position. With the air dam 14 in the stowed position, the user can then operate the vehicle 10 with increased clearance to ground G.

The user can then reposition the air dam 14 in the deployed position by disengaging the quick-release pins 22, repositioning the air dam 14 into the deployed position, and then reengaging the quick-release pins 22.

Utilizing the quick-release pins 22 to secure the air dam 14 facilitates quickly transitioning the air dam 14 between the deployed position and the stowed position.

Figure 5:
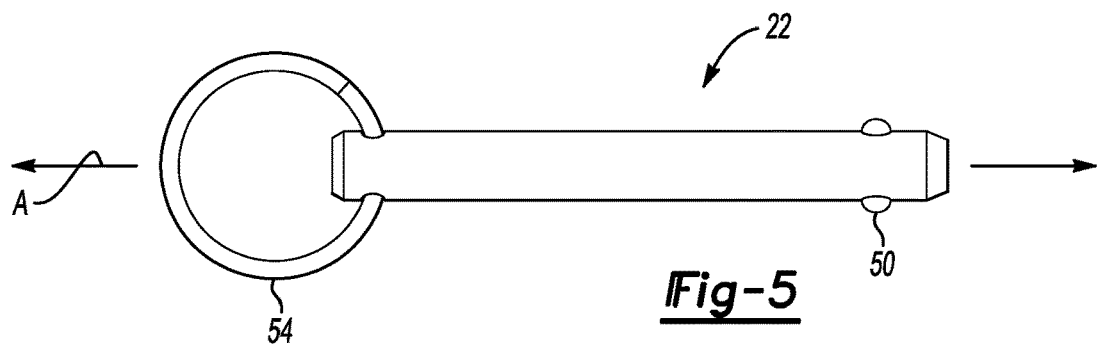
FIG. 5 illustrates a quick-release pin used to secure the air dam of FIGS. 1-4.

With reference to FIG. 5, the quick-release pin 22, in the example embodiment, is a ball-lock pin quick-release pin that includes a plurality of spring-biased retaining members 50. The members 50 are biased radially outward away from the longitudinal axis A of the quick-release pin 22. The members 50 hold the quick-release pin 22 in an installed position within the apertures 26 and 32, or within the apertures 26 and 46.

Access and visibility to the quick-release pin 22 can be compromised due to the air dam 14 being secured to the vehicle structure 34D behind the front bumper 18. The user may have to move the quick-release pin 22 between the engaged position and disengaged position without being able to view the quick-release pin 22.

To facilitate transitioning between the engaged position of FIG. 2 and the disengaged position of FIG. 3, the example quick-release pin 22 is configured such that quick-release pin 22 can be transitioned in response to movement along the longitudinal axis A and without requiring rotation of quick-release pin 22 about the axis A. To facilitate transitioning the quick-release pin 22 between the engaged and disengaged positions, the example quick-release pin 22 include a pull ring 54. The user can reach behind the air dam 14 and pull the pull ring 54 to pull the quick-release pin 22 along the axis A. and transition the quick-release pin 22 from the engaged position to the disengaged position.

In some examples, when the air dam 14 is in the deployed position, the air dam 14 can be raised and lowered. An actuator can be used to raise and lower the vehicle structures 34D and 34P, which raises and lowers the air-dam 14. A person having skill in this art and the benefit of this disclosure could understand suitable actuators utilized to raise and lower an active air dam.

The air dam 14 that can be raised and lowered when in the deployed position is an active air dam. The air dam 14 may be automatically lowered when the vehicle 10 is driven at highway speeds, but automatically raised when the vehicle is traveling at slower speeds.

With reference to FIGS. 6A-7B, in another exemplary embodiment, transitioning from an engaged position to a disengaged position occurs without fully withdrawing the quick-release pin 22A from the vehicle structure 34D and the air dam 14. In this example, the quick-release pin 22A can be pulled along a longitudinal axis of the quick-release pin 22A from the position of FIGS. 6A and 6B to the position of FIGS. 7A and 7B. A cotter pin 56 is connected to an end of the quick-release pin 22A. When the quick-release pin 22A is pulled, the cotter pin 56 prevents the quick-release pin 22A from being fully withdrawn.

A slot 64A extends through both a vehicle structure 34A and a collar 30A of an air dam 14A. Pulling the quick-release pin 22A along the axis can reposition areas of the quick-release pin 22A along an axis of the quick-release pin 22A. In this example, a section 60 of the quick-release pin 22A is repositioned to be within the slot 64A rather than a section 68 of the quick-release pin 22A. The section 60 has a reduced diameter relative to the section 68. When the section 68 is within the slot 64A, the quick-release pin 22A is not able to slide through a narrower section 72 of the slot 64A. When the section 60 is within the slot 64A, the quick-release pin 22A can slide through the narrower section 72 of the slot 64A.

Figure 6A:
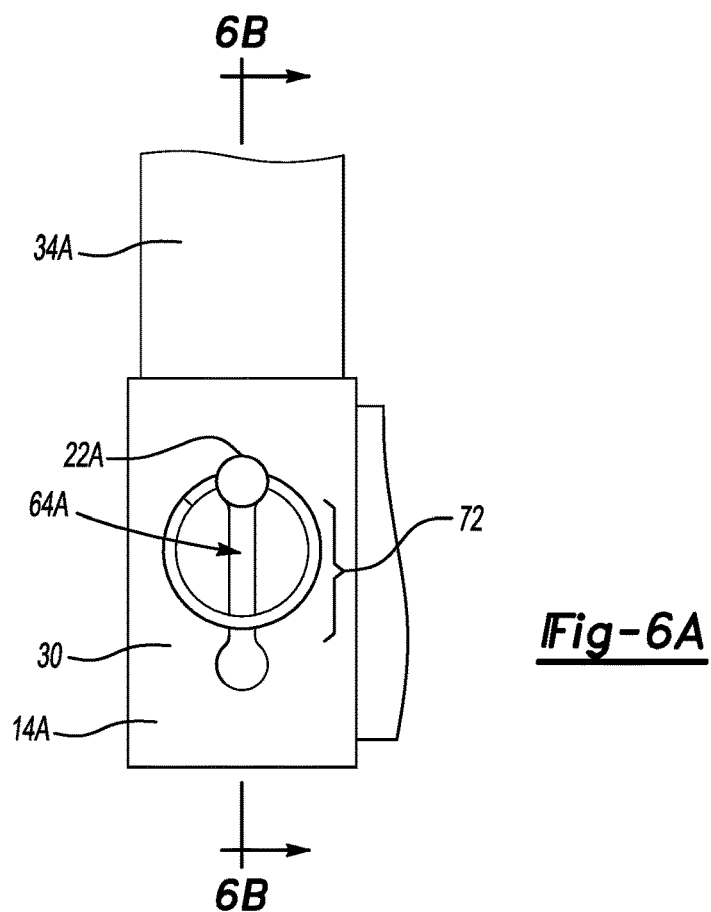
FIG. 6A is a section view of a quick-release pin securing an air dam to a vehicle structure according to another exemplary aspect of the present disclosure.
Figure 6B:
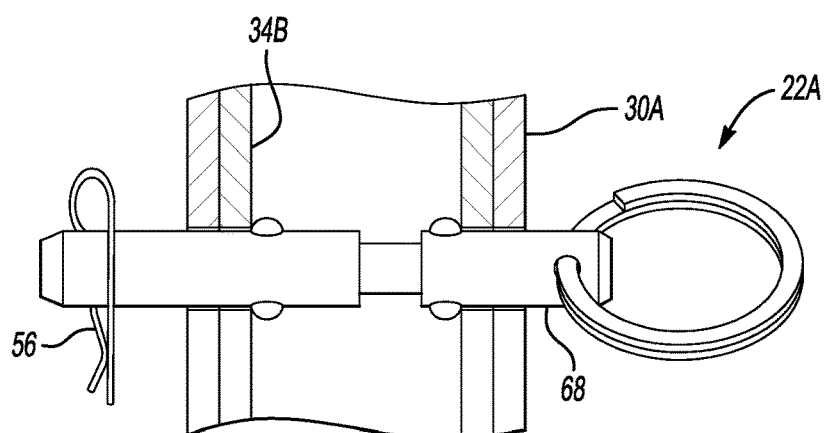
FIG. 6B is a side view of the quick-release pin and air dam of FIG. 6A.
Figure 7A:
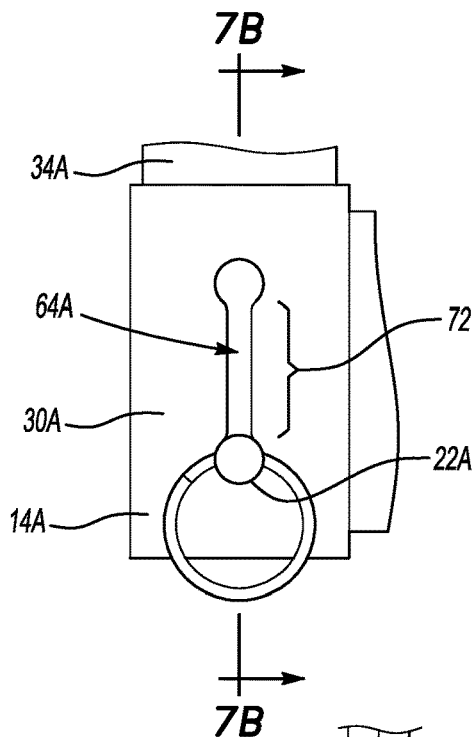
FIG. 7A is a section view of the quick-release pin of FIGS. 6A and 6B when the pin is moved to a position where the air dam can be transitioned between a stowed position and a deployed position.
Figure 7B:
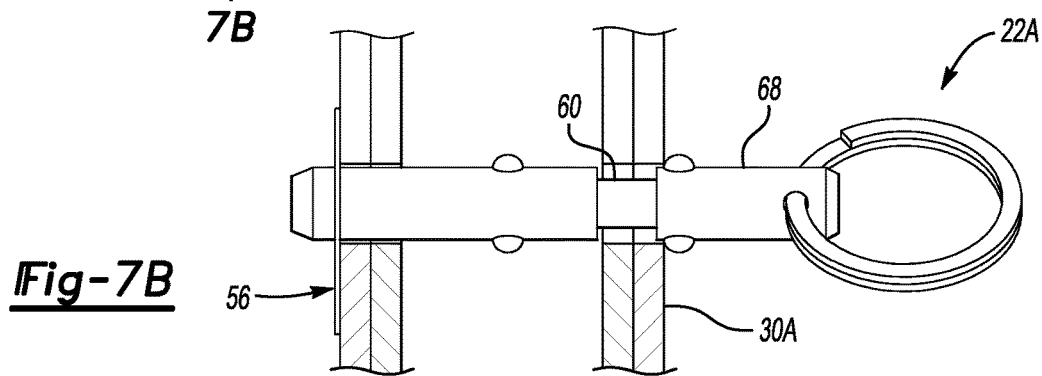
FIG. 7B is a side view of the quick-release pin and air dam of FIG. 7A.

Positioning the reduced radius section 60 of the quick-release pin 22A within the slot 64A enables the quick-release pin 22A to slide through a narrower section 72 of the slot 64A from the stowed position of FIGS. 6A and 6B to the deployed position of FIGS. 7A and 7B. The quick-release pin 22A can then be pressed axially in the opposite direction so that section 68 is within the slot 64A. Areas of the quick-release pin 22 could be marked with tape, painted, or otherwise differentiated to provide a visual indicator when the quick-release pin 22A is not pressed fully into a position where the section 68 is within the slot 64A.

Figure 8:
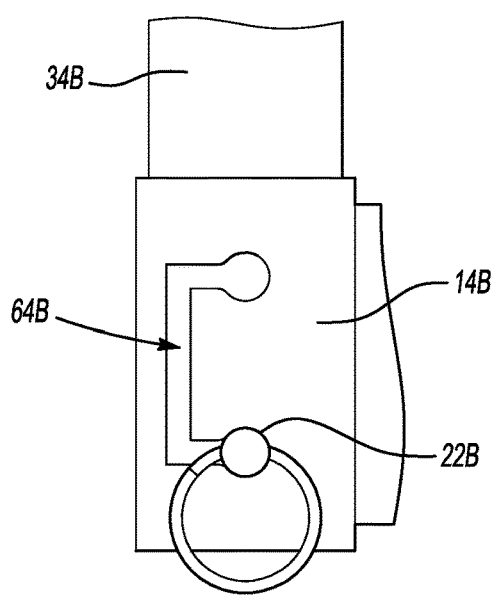
FIG. 8 is a side view of a quick-release pin securing an air dam to a vehicle structure in a stowed position according to another exemplary aspect of the present disclosure.
Figure 9:
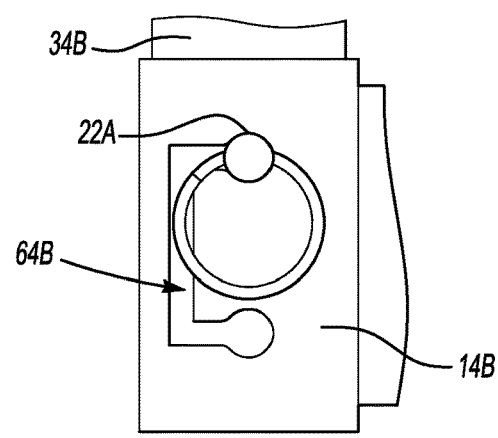
FIG. 9 is a side view of a quick-release pin securing the air dam of FIG. 8 to a vehicle structure in a deployed position according to another exemplary aspect of the present disclosure.

FIGS. 8 and 9 show another variation where a slot 64B in a collar 30B and a vehicle structure 34B is C-shaped in profile. The horizontally extending sections of the slot 64B forces horizontal movement of the quick-release pin 22B when transitioning an air dam 14B between the stowed position of FIG. 9 and the deployed position of FIG. 8. Incorporating the horizontally extending section can be useful to stabilize the air dam 14A when in the stowed position or the deployed position.

Figure 10:
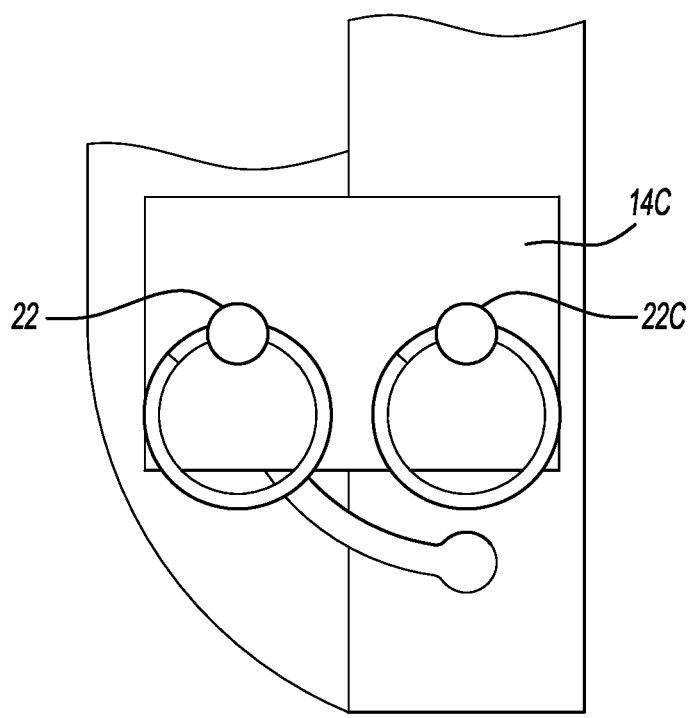
FIG. 10 is a side view of a pair of quick-release pins securing an air dam to a vehicle structure in a stowed position according to another exemplary aspect of the present disclosure.
Figure 11:
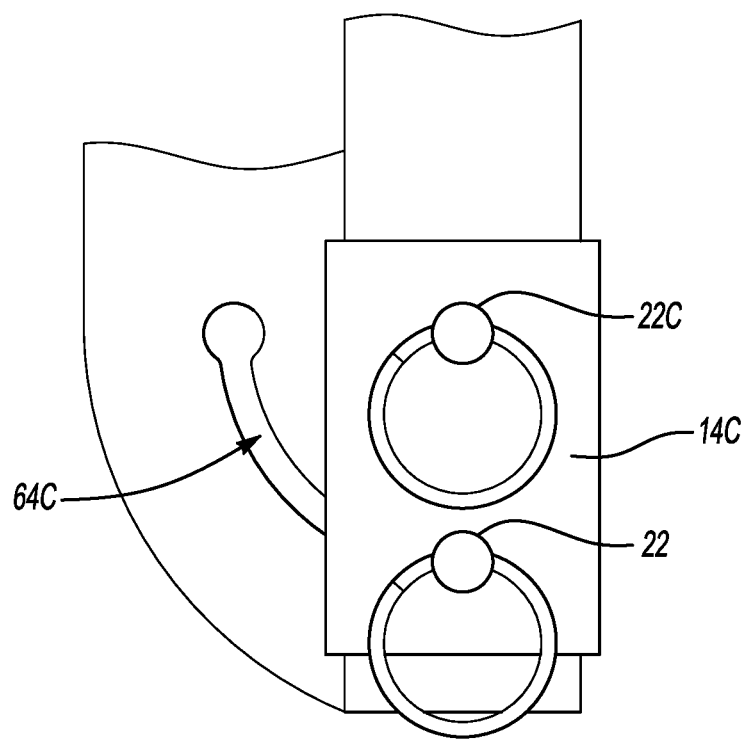
FIG. 11 is a side view of the quick-release pins securing the air dam of FIG. 10 to the vehicle structure in a deployed position according to another exemplary aspect of the present disclosure.

The exemplary embodiments illustrate raising and lowering an air dam relative to a vehicle structure when transitioning the air dam between a stowed position and a deployed position. In other examples, the transitioning of the air dam could involve tilting the air dam instead of, or in addition to, sliding the air dam 14 vertically upward relative to a corresponding structure of the vehicle 10. For example, as shown in FIGS. 10 and 11, an air dam 14C could be pivoted about a quick-release pin 22C while another quick release pin 22C is pulled axially, and then slid within a curved slot 64C. The air dam 14C can be pivoted between the stowed position of FIG. 10 and the deployed position of FIG. 11.

The example quick-release pins 22, 22A can include the spring biased retaining members. Other example quick-release pins include those having a button that can be pressed to move an internal shaft axially to provide room for retaining members to move radially inward. The pressing of the button may be needed to overcome a spring that biases the internal shaft. When the button is released, the shaft returns to its former position and forces the retainer members back radially outward.

Detent pins, Indexing pull pins, and lifting pins are other types of quick-release pins that could be used in connection with the teachings of this disclosure.

Features of the disclosed examples include a fastening system that facilitates a quick transition of an air dam between a deployed position and a stowed positon. In the deployed position, some embodiments include manipulating the position of the air dam using an actuator such that the air dam is an active air dam.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An air dam assembly, comprising:
   an air dam; and
   a quick-release pin that secures the air dam to a vehicle structure, wherein the vehicle structure includes a passenger side member having a first passenger side aperture and a second passenger side aperture, wherein the quick-release pin includes a passenger side quick-release pin that extends through the first passenger side aperture to couple the air dam to the passenger side member in a deployed position, wherein the passenger side quick-release pin extends through the second passenger side aperture to couple the air dam to the passenger side member in a stowed position.

2. The air dam assembly of claim 1, wherein the quick-release pin secures the air dam assembly to the vehicle structure when the air dam assembly is in the deployed position, wherein the quick-release pin secures the air dam assembly to the vehicle structure when the air dam assembly is in the stowed position.

3. The air dam assembly of claim 1, further comprising an actuator assembly, wherein the air dam is an active air dam and that can be raised and lowered by the actuator assembly when the air dam assembly is in the deployed position.

4. The air dam assembly of claim 1, wherein the quick-release pin is a ball-lock pin.

5. The air dam assembly of claim 1, wherein the quick-release pin includes a plurality of spring-biased retaining members.

6. The air dam assembly of claim 1, wherein the quick-release pin includes a pull ring.

7. The air dam assembly of claim 1, wherein the quick-release pin includes a cotter pin that engages the quick-release pin.

8. The air dam assembly of claim 1, wherein the quick-release pin transitions between an engaged position and a disengaged position in response to movement of the quick-release pin along a longitudinal axis of the quick-release pin and without requiring rotation of the quick-release pin about the longitudinal axis.

9. The air dam assembly of claim 1, wherein the quick-release pin extends through an aperture in the air dam and aperture in the vehicle structure when securing the air dam to the vehicle structure.

10. The air dam assembly of claim 9, wherein the air dam can be moved between a raised position and a lowered position without withdrawing the quick-release pin from the aperture in the air dam and the aperture in the vehicle structure.

11. The air dam assembly of claim 1, wherein the first passenger side aperture is vertically beneath the second passenger side aperture.

12. The air dam assembly of claim 1, wherein the vehicle structure includes a driver side member having a first driver side aperture and a second driver side aperture, wherein the quick-release pin includes a driver side quick-release pin that extends through the first driver side aperture to couple the air dam to the driver side member in the deployed position, wherein the driver side quick-release pin extends through the second driver side aperture to couple the air dam to the driver side member in the stowed position.

13. The air dam assembly of claim 1, wherein the driver side member and the passenger side member are both hollow tubes.

14. An air dam positioning method, comprising:
    when an air dam is in a first position, coupling the air dam to a vehicle structure using at least one quick-release pin in an engaged position;
    transitioning the at least one quick-release pin to a disengaged position;
    when the quick-release pin is in the disengaged position, moving the air dam to a second position that is different than the first position; and
    when the air dam is in the second position, coupling the air dam to the vehicle structure using the at least one quick-release pin.

15. The method of claim 14, further comprising transitioning the at least one quick-release pin from the engaged position to the disengaged position by sliding the at least one quick-release pin along a longitudinal axis of the quick-release pin without requiring a rotating of the at least one quick-release pin about the longitudinal axis.

16. The method of claim 14, wherein air dam is more elevated when in the first position than when in the second position.

17. The method of claim 14, wherein transitioning the at least one quick-release pin includes moving a plurality of spring-biased retaining members of the at least one quick-release pin radially relative to a longitudinal axis of the at least one quick-release pin.

18. The method of claim 14, wherein the air dam is an active air dam and further comprising, when the air dam is in the second position, automatically moving the air dam between a raised position and a lowered position.

* * * * *